(12) United States Patent
Wang

(10) Patent No.: US 6,285,280 B1
(45) Date of Patent: Sep. 4, 2001

(54) METHOD FOR DETECTING A DEFLATED TIRE ON A VEHICLE

(75) Inventor: Orson Szu-Han Wang, Ann Arbor, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/605,686

(22) Filed: Jun. 26, 2000

(51) Int. Cl.$^7$ .................................................. B60C 23/00
(52) U.S. Cl. ........................ 340/444; 340/442; 73/146.2
(58) Field of Search ..................................... 340/442, 443, 340/444, 446, 447; 73/146.1, 146.2

(56) References Cited

U.S. PATENT DOCUMENTS

| | | | |
|---|---|---|---|
| 4,876,528 | 10/1989 | Walker et al. | 340/442 |
| 5,192,929 | 3/1993 | Walker et al. | 340/444 |
| 5,239,469 | 8/1993 | Walker et al. | 340/442 |
| 5,248,957 | 9/1993 | Walker et al. | 340/444 |
| 5,252,946 | 10/1993 | Walker et al. | 340/444 |
| 5,345,217 | 9/1994 | Prottey | 340/442 |
| 5,442,331 | 8/1995 | Kishimoto et al. | 340/444 |
| 5,483,220 | 1/1996 | Kushimoto et al. | 340/444 |
| 5,524,482 | 6/1996 | Kushimoto et al. | 340/444 |
| 5,541,573 | 7/1996 | Jones | 340/444 |
| 5,552,760 | 9/1996 | Jones | 340/444 |
| 5,561,415 | 10/1996 | Dieckmann | 340/444 |
| 5,578,984 | 11/1996 | Nakajima | 340/444 |
| 5,589,815 | 12/1996 | Nishihara et al. | 340/444 |
| 5,589,816 | 12/1996 | Jones | 340/444 |
| 5,591,906 | 1/1997 | Okawa et al. | 340/444 |
| 5,604,307 | 2/1997 | Iida et al. | 340/444 |
| 5,619,111 | 4/1997 | Katagiri et al. | 318/625 |
| 5,629,478 | 5/1997 | Nakajima et al. | 340/444 |
| 5,691,694 | 11/1997 | Horie | 340/442 |
| 5,710,539 | 1/1998 | Iida et al. | 340/444 |

(List continued on next page.)

FOREIGN PATENT DOCUMENTS

| | | |
|---|---|---|
| 2093167 | 10/1997 | (CA) . |
| 0 657 314 A | 6/1995 | (EP) . |
| 0 786 362 A | 7/1997 | (EP) . |
| 0 802 074 A | 10/1997 | (EP) . |
| 0 826 525 A | 3/1998 | (EP) . |

(List continued on next page.)

OTHER PUBLICATIONS

Hines and Montgomery; Probability and Statistics in Engineering and Management Science, pp. 456–465, 474–475.

* cited by examiner

Primary Examiner—Van T. Trieu
(74) Attorney, Agent, or Firm—Michael Best & Friedrich LLP

(57) ABSTRACT

A method for detecting the loss of pressure in a tire of a motor vehicle having first and second wheels on a driven axle and a tire on each of the wheels. Each of the tires has a grip-rate. The method includes measuring the wheel speeds of the first wheel and the second wheel a plurality of times n, calculating a difference in wheel speed value between the first wheel and the second wheel for each of the plurality of times n, determining a value representative of the tractive force for the first wheel and the second wheel for each of the plurality of times n, pairing each difference in wheel speed value with the corresponding value representative of the tractive force, performing a linear regression on the n pairings of the difference in wheel speed values and the values representative of the tractive force, and analyzing the linear regression to determine whether a tire on one of the first and the second wheels is deflated. Preferably, determining the value representative of the tractive force includes determining either a driven wheel force value or a driven wheel slip value for each of the plurality of times n. Analyzing the linear regression preferably includes determining the slope of a best-fit line.

25 Claims, 3 Drawing Sheets

U.S. PATENT DOCUMENTS

| | | | |
|---|---|---|---|
| 5,721,374 | 2/1998 | Siekkinen et al. | 340/442 |
| 5,721,528 | 2/1998 | Boesch et al. | 340/442 |
| 5,724,266 | 3/1998 | Kishimoto et al. | 340/442 |
| 5,734,319 | 3/1998 | Stephens et al. | 340/442 |
| 5,747,686 | 5/1998 | Nishihara et al. | 340/444 |
| 5,748,076 | 5/1998 | Horie | 340/442 |
| 5,760,682 | 6/1998 | Liu et al. | 340/444 |
| 5,771,480 * | 6/1998 | Janase | 73/146.2 |
| 5,783,991 | 7/1998 | Jones | 340/444 |
| 5,826,207 | 10/1998 | Ohashi et al. | 340/444 |
| 5,828,975 | 10/1998 | Isshiki et al. | 340/444 |
| 5,838,230 | 11/1998 | Jones | 340/444 |
| 5,844,475 | 12/1998 | Horie | 340/442 |
| 5,866,812 | 2/1999 | Nishihara et al. | 340/443 |
| 5,907,097 | 5/1999 | Nakajima | 73/146.2 |
| 5,929,756 | 7/1999 | Randazzo et al. | 340/444 |
| 5,936,519 | 8/1999 | Nakajima et al. | 340/444 |
| 5,939,626 * | 8/1999 | Tominaga et al. | 73/146.2 |
| 5,982,279 * | 11/1999 | Tominaga et al. | 340/444 |
| 6,060,983 * | 5/2000 | Yanase et al. | 340/442 |

FOREIGN PATENT DOCUMENTS

| | | |
|---|---|---|
| 0 826 968 A | 3/1998 | (EP) . |
| 0 832 767 A | 4/1998 | (EP) . |
| 0 872 362 A | 10/1998 | (EP) . |
| 0 872 363 A | 10/1998 | (EP) . |
| 0 787 606 A | 11/1998 | (EP) . |

METHOD FOR DETECTING A DEFLATED TIRE ON A VEHICLE

FIELD OF THE INVENTION

The invention relates to a method of detecting when the air pressure in a tire has fallen below a predetermined pressure level, based on the measured wheel speeds.

BACKGROUND OF THE INVENTION

The advent of anti-lock brake systems (ABS) and the placement of speed sensing devices at each of the wheels has sparked efforts to develop reliable methods for detecting tire deflation based on wheel speeds measured during driving. Theoretically, four equally inflated tires on a vehicle will have substantially the same rolling radius and will therefore each rotate at substantially the same speed during straight-line driving on a dry, flat and uniform surface. When a tire becomes deflated, its rolling radius is reduced and the wheel speed increases to compensate for the smaller radius. Numerous methods of detecting deflated tires based on the rolling radius concept have been created. These methods monitor the wheel speeds and detect variations that may be attributable to tire deflation.

The rolling radius effect is not the only influence acting on a tire. For any tire, there is also a grip-rate effect. Simply stated, the grip-rate of a tire is defined as the ratio of the longitudinal tractive force (i.e., torque) applied to the wheel versus the longitudinal tire slip. For a normally inflated tire, the grip-rate remains substantially constant and there is a direct correlation between the tractive force applied to the wheel and the corresponding slip experienced by the tire. As a tire becomes deflated, however, the pressure at the contact patch is lowered and the grip-rate is increased. The lower pressure causes the tire to grip the road better and slip less than a normally inflated tire.

When analyzed with respect to the driven wheels of the vehicle, the grip-rate effect causes problems for tire deflation detection methods that use the rolling radius concept. In situations when a high accelerative tractive force is exerted on a deflated tire (driving with full throttle up a hill or operating the vehicle at high or maximum speeds), the increased grip-rate causes the wheel to spin slower than it would if its tire were normally inflated and slipping more. Recall, however, that a wheel with a deflated tire also has a smaller rolling radius, causing it to spin faster than a wheel with a normally inflated tire. Therefore, under high accelerative tractive forces, the tendency toward slower wheel speed due to the increased grip-rate often reduces or cancels out the tendency toward increased wheel speed caused by the smaller rolling radius of a deflated tire, causing the net observed wheel speed to be identical to that of a normally inflated tire. When this occurs, a deflated tire may go undetected.

Another influencing factor that creates problems for methods based on the rolling radius concept is the variety of loading conditions that the tires can experience. Depending on the position of the load in a vehicle, it is often common to have one or more tires that are loaded more heavily than the other tires. Normally inflated tires that carry a heavier load will have a smaller rolling radius than normally inflated tires carrying a lighter load. Therefore, the wheels carrying the heavier load will have a higher rotational speed than the wheels carrying the lighter load. Since most rolling radius detection methods compare the wheel speeds to one another, the effects of asymmetrical loading are often misinterpreted as a deflated tire.

In prior art methods that use the rolling radius concept, the problems associated with the grip-rate effect are normally addressed by tuning the system to be more sensitive, while the problems associated with the asymmetrical loading effect are normally addressed by tuning the system to be less sensitive. A compromise sensitivity level that adequately compensates for both problems is frequently impossible to achieve.

Several attempts have been made to address the effects of grip-rate changes and/or the effects of asymmetrical loading. U.S. Pat. No. 5,936,519 discloses a rolling radius method for detecting tire pressure drop wherein the deflation detection calculation (known as a "sum of the diagonals" calculation) only utilizes data collected when the tractive effort on the tire is low, that is, when the vehicle is decelerating without application of the brake. In other words, the method copes with the grip-rate effect by filtering out the data that is potentially flawed by the grip-rate influence. This discriminating method simply eliminates the problematic data commonly collected during high speed driving or uphill driving. By eliminating this data however, the deflation detection method is not particularly robust as it simply ignores potentially valuable data.

Other prior art tire deflation detection methods have attempted to incorporate the grip-rate concept as part of the deflation detection process. The main engine of these methods is the inherent correlation between the driven wheel force and the driven wheel slip as described above.

U.S. Pat. No. 5,561,415 discloses a method for determining pressure loss in tires on a driven axle by correlating simultaneously collected wheel slip values and wheel drive force values. The method seeks to detect when the overall or aggregate grip-rate of the driven axle has changed. If the drive force values for the driven axle are not available, acceleration data is used to estimate the drive force. The correlated data is compared to a predetermined characteristic curve to determine whether a tire on the driven axle is deflated.

This method is problematic in that the two driven wheels are not treated independently. Rather, the two driven wheels are treated in the aggregate which can result in faulty deflation detection. Specifically, a relatively negligible inflation loss in each tire on the driven axle can be interpreted as a single critically deflated tire. Additionally, when the drive force is estimated, assumptions regarding payload mass must be made. These assumptions do not consider the effects of asymmetrical loading. False detection or failure to detect may result. While the method does discuss the possibility of using measured payload values, payload adjusting values, or manually input approximate payload values, such corrections involve additional burdensome steps.

U.S. Pat. No. 5,747,686 also discloses a method of detecting a deflated tire based on the correlation between drive force and drive slip. The driven wheel torque is calculated and used to predict what the driven wheel slip should be in light of the direct correlation. The actual driven wheel slip is then calculated from wheel velocity data and compared to the predicted driven wheel slip to determine if there is a deflated tire.

This method is problematic in that the left side tires are treated independently of, and isolated from, the right side tires. The tires of each side of the vehicle are treated in the aggregate which can result in faulty deflation detection. For example, a relatively negligible overinflation of the left follower tire and a relatively negligible deflation of the left driven tire can be interpreted as a critically deflated left side driven tire.

In addition to the aggregation problems discussed above, the prior art grip-rate methods are also susceptible to false detection or failure to detect due to tire changes. Different tire models have different nominal grip-rates such that installation of a different tire, having a new nominal grip-rate, may fool the prior art methods, which, to one extent or another, measure grip-rates relative to a fixed value stored in the program.

SUMMARY OF THE INVENTION

The present invention provides an improved deflation detection method based on the grip-rate concept. Unlike the prior art grip-rate methods, the method of the present invention determines if there is a difference in the grip-rates of the two driven tires to determine if one of the tires is deflated. By comparing the grip-rates of the two driven tires, the present invention is not susceptible to false detections caused by the aggregation of data from two tires having various combinations of negligible overinflation or under-inflation. Additionally, since the method of the present invention determines if there is a difference in grip-rates between the two tires, and the determination is not based on a comparison to a stored grip-rate value, it is not susceptible to error due to differing tire models. Assuming that both tires on a driven axle are the same or similar models and are changed at substantially the same time, there will be substantially no error due to grip-rate variation between different tire models.

Since the method of the present invention is not based on the rolling radius concept, the variations in rolling radii due to manufacturing disparities or asymmetric loading do not negatively influence the detection method of the present invention. Additionally, the grip-rate method of the present invention utilizes the normally detrimental combination of the rolling radius effect and the grip-rate effect to its advantage in determining whether a tire on the driven axle is deflated. As such the method of the present invention can detect tire deflation under driving conditions not normally conducive to accurate tire deflation detection with the rolling radius methods (i.e., hill driving, strong forward acceleration, high speed driving). In fact, the grip-rate method of the present invention requires periods of such high tractive force driving conditions to function properly.

Furthermore, unlike the prior art grip-rate methods that rely on the correlation between drive slip and drive force, and need data on both the drive slip and the drive force to function, the grip-rate method of the present invention can be practiced using only one or the other of the drive slip values and the drive force values. If torque values are not readily available, the method of the present invention can be used with only drive slip values, thereby eliminating the faulty loading assumptions associated with estimating the drive torque values. On the other hand, if torque values are readily available, there is no need to measure drive slip.

This invention can take advantage of the fact that in the majority of cases, an open differential is used at the driven axle. One property of an open differential on a driven axle is that it distributes torque equally between the two wheels. For this reason, the present invention does not need to measure the grip-rate independently for each wheel, but rather can use the difference in wheel speeds on the driven axle to determine whether there is a difference in the grip-rates of the tires on the two driven wheels. Similarly, for an all-wheel-drive vehicle that has open differentials with a constant apportioning of torque between the front and the rear axles (e.g., 50% front to 50% rear, 30% front to 70% rear, etc.), the torque distribution is easily derived from the engine torque based on the torque information supplied by the engine controller and the behavior of the commonly used open differentials.

In light of the ability to use only drive torque values, the method of the present invention is a particularly good candidate for use on all-wheel-drive vehicles, wherein each wheel of the vehicle is driven and the torque for each wheel can be determined. The prior art grip-rate methods typically require at least one un-driven wheel as a reference, and are thus not suited for use on all-wheel-drive vehicles.

Alternatively, the present invention can be used in conjunction with an existing rolling radius method to supplement the detection process by more accurately assessing the inflation status of the tires on the driven wheels. By applying the grip-rate method of the present invention to the driven wheels of a vehicle that is already equipped with a rolling radius deflation detection method, a robust hybrid method can be created.

More specifically, the invention provides a method for detecting the loss of pressure in a tire of a motor vehicle having first and second wheels on a driven axle and a tire on each of the wheels. Each of the tires has a grip-rate. The method includes measuring the wheel speeds of the first wheel and the second wheel a plurality of times n, calculating a difference in wheel speed value between the first wheel and the second wheel for each of the plurality of times n, determining a value representative of the tractive force for the first wheel and the second wheel for each of the plurality of times n, pairing each difference in wheel speed value with the corresponding value representative of the tractive force, performing a linear regression on the n pairings of the difference in wheel speed values and the values representative of the tractive force, and analyzing the linear regression to determine whether a tire on one of the first and the second wheels is deflated. Preferably, determining the value representative of the tractive force includes determining either a driven wheel force value or a driven wheel slip value for each of the plurality of times n. Analyzing the linear regression preferably includes determining the slope of a best-fit line.

Other features and advantages of the invention will become apparent to those skilled in the art upon review of the following detailed description, claims, and drawings.

Figure 1:
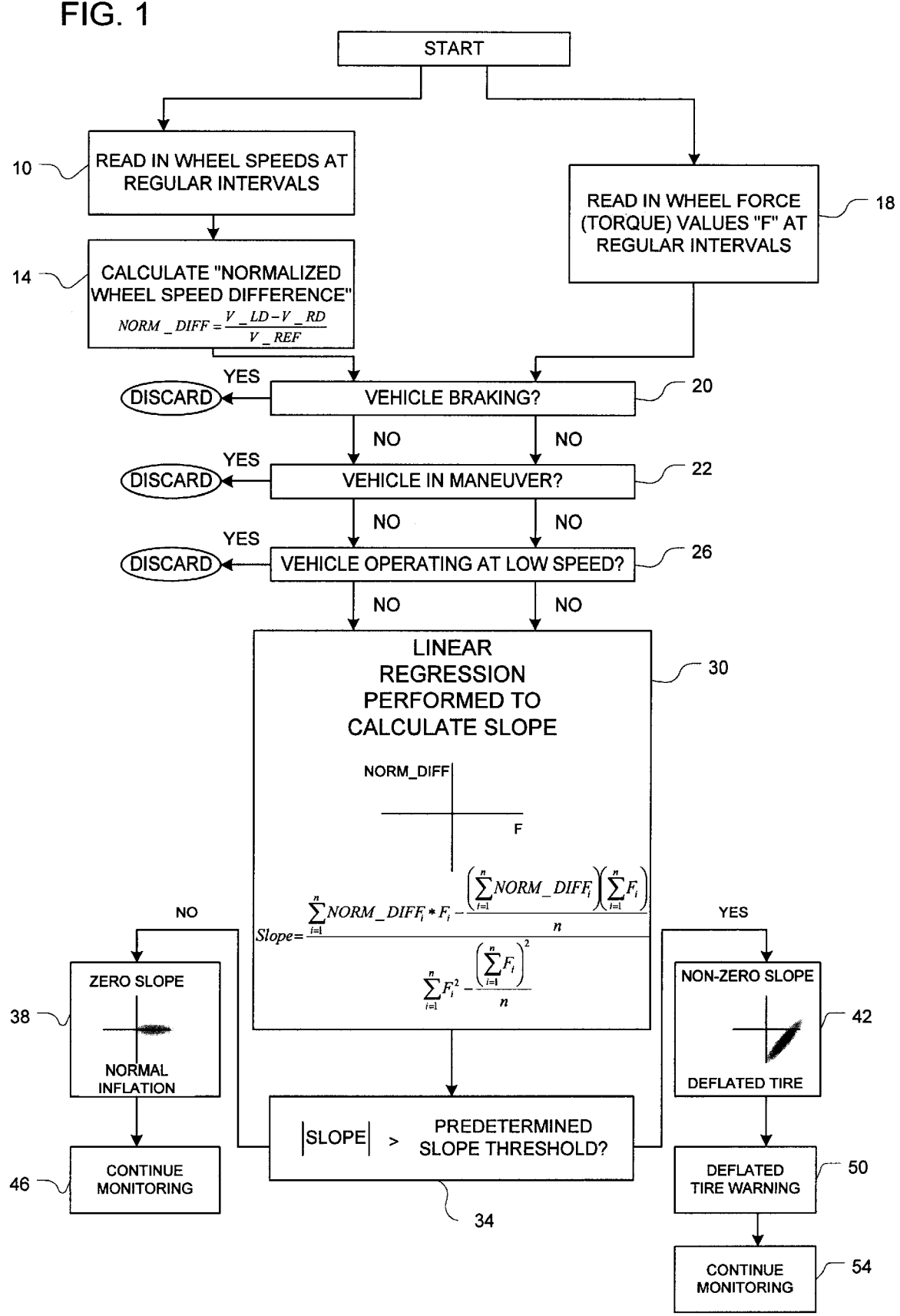
FIG. 1 represents a flow chart of a method of detecting a deflated tire according to the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

The flow chart represented in FIG. 1 outlines a simplified rendition of a computer program that can be used to practice the method of the present invention. The method can be practiced using any device capable of storing and processing the data in the manner described below. Unlike most rolling radius methods, the method of the present invention does not go through an initial calibration loop, but rather begins monitoring tire inflation immediately. Additionally, there is no action required on behalf of the vehicle's operator to initialize or reset the system prior to operation.

Throughout the program, wheel speeds are read in (block 10) from the wheel speed sensors at each of the four wheels at regular sampling intervals. These wheel speed values are used to calculate the normalized wheel speed difference NORM_DIFF (block 14). The normalized wheel speed difference for the driven wheels on any axle is expressed mathematically as:

$$NORM\_DIFF = \frac{V\_LD - V\_RD}{V\_REF}, \text{ where}$$

V_LD is the speed of the left driven wheel on the axle,
V_RD is the speed of the right driven wheel on the axle, and
V_REF is the vehicle reference speed.

The vehicle reference speed is simply the average speed of all four wheels. Of course, the normalized wheel speed difference could also by calculated by subtracting the speed of the left driven tire from the speed of the right driven tire in the equation's numerator.

Throughout the program, the system also reads in wheel force (torque) values F at the same regular intervals (block 18). In newer vehicles, the torque values F are calculated and stored in the engine's computer and are readily available for use with the tire inflation monitoring system. Alternatively, the torque values F could be calculated from anything representative of, or proportional to, the applied torque, or could be measured using technology capable of directly measuring the torque being input to a wheel.

Each data pair consisting of a normalized wheel speed difference value and a torque value is then passed through a series of filters. Data collected while the vehicle is braking is discarded (block 20) since uneven brake pad wear may result in erroneous results. Next, a maneuver check is performed (block 22), wherein the wheel speeds are compared with respective fixed ranges to determine whether the vehicle is cornering. If the vehicle is determined to be in a turn, the program discards the data set.

If the vehicle is not braking or cornering, the program checks to see if the data was collected while the vehicle was operating at low speed (block 26). Preferably, the program determines if the vehicle was operating at a speed of less than ten kilometers per hour. If so, the program discards the data set. If the vehicle speed is equal to or greater than 10 kilometers per hour, the data is used for the tire inflation monitoring. It should be noted that the sequence of the filtering is not critical to the invention and could be changed. Furthermore, the filtering could be performed immediately after block 10, prior to the calculation of NORM_DIFF and the reading-in of the F value. Also, additional filters could be added as desired. For example, the NORM_DIFF value and the F value data sets could be run through a first-order low pass filter as is known to those in the art.

The tire inflation detection method of the present invention is driven by the relationship between the normalized wheel speed difference and the wheel force, and it is this relationship that will be used to accurately determine whether a driven wheel has a deflated tire. The relationship is parametric, meaning that both the normalized wheel speed difference and the wheel force are functions of time. Additionally, the relationship is dynamic, meaning that to accurately determine tire deflation, the vehicle must traverse a range of force inputs corresponding to a range of throttle inputs.

The relationship between the normalized wheel speed difference and the torque value is analyzed by performing a linear regression on the filtered data pairs (block 30). The linear regression analysis is described in statistical texts. See for example, Hines and Montgomery, Probability and Statistics in Engineering and Management Science, pp. 456–475.

For the purposes of illustration only, the data sets can be plotted in a scatter diagram of NORM_DIFF versus F, with NORM_DIFF plotted on the Y-axis and F plotted on the X-axis (the program of the present invention need not physically plot the data points on a scatter diagram). The equation used to determine the slope of the best-fit line for the plotted data is:

$$\text{Slope} = \frac{\sum_{i=1}^{n} NORM\_DIFF_i * F_i - \frac{\left(\sum_{i=1}^{n} NORM\_DIFF_i\right)\left(\sum_{i=1}^{n} F_i\right)}{n}}{\sum_{i=1}^{n} F_i^2 - \frac{\left(\sum_{i=1}^{n} F_i\right)^2}{n}},$$

where n represents the total number of data samples being used and the subscript "i" represents each individual data set collected in the n samples.

Once the slope of the best-fit line has been calculated, the absolute value of the slope is compared to a predetermined threshold slope value (block 34) to determine whether the slope is substantially zero (block 38), or substantially non-zero (block 42). The threshold slope value is selected based on the desired sensitivity of the deflation detection system.

Recall from above that at a constant grip-rate, the tractive force and the tire slip are directly related. As more force is applied, the tire will slip more and the wheel speed will increase. This means that for a tire having a constant grip-rate, the relationship between the wheel force and the wheel speed is substantially proportional. Therefore, if the grip-rate of both of the driven tires on an axle remains the same (as is the case when both tires are normally inflated), the wheel speeds of both tires will be substantially the same and the NORM_DIFF values will be approximately zero, regardless of the force values. In the scatter diagram, the best-fit line of the plotted data will have a substantially zero slope (block 38).

However, recall from above that at high wheel force values, the increased wheel speed of a deflated tire due to the rolling radius effect is offset by the decreased wheel speed associated with the increase in the deflated tire's grip-rate. Therefore, when one driven tire on the axle is normally inflated and the other driven tire on the axle is deflated, the NORM_DIFF values calculated with respect to high force values will be closer to zero than the NORM_DIFF values calculated with respect to lower force values. Therefore, a deflated tire on either wheel of the driven axle will cause the NORM_DIFF values to vary with respect to wheel force values. Over time, the variation will result in a scatter diagram with a best-fit line having a non-zero slope (block 42).

Therefore, the linear regression is performed to determine the slope of the best-fit line correlating to the data in the scatter diagram. The slope of the best-fit line represents the difference in tire grip-rate for the two tires on the driven axle. If the best-fit line of the data in the scatter diagram has a substantially zero slope, there is substantially no difference in grip-rate between the two tires and no deflated tire (block 38). The program continues monitoring (block 46) by collecting more data and continually performing the linear regression slope calculation.

If, on the other hand, the slope of the best-fit line is non-zero, the grip-rate of one of the driven tires on the axle has changed, signaling that one of the tires on the driven axle is deflated (block 42). With the calculation of NORM_DIFF as shown above, a negative slope indicates that the left tire is deflated and a positive slope indicates that the right tire is deflated. When a non-zero slope is detected, the system issues a warning to the vehicle operator (block 50). It is then assumed that the operator will take the appropriate action needed to return the deflated tire to its properly inflated state.

Any wheel speed differences due to asymmetric loading conditions will be consistently reflected in all of the NORM_DIFF values, which will not change with respect to changes in wheel force since the grip-rate of a tire does not substantially change with changes in loading forces. As a result, the effects of asymmetric loading will harmlessly offset the best-fit line, changing only the Y-intercept and not the slope. Therefore, the grip-rate method of the present invention is immune from the negative effect that asymmetric loading typically has on rolling radius methods.

There is no need for a reset switch as the system simply continues monitoring (block 54) after the warning has been issued (block 50). If the deflation has been corrected, the slope will return to zero over time and the warning (typically a light in the passenger compartment) will shut off. If, however, immediate termination of the warning signal is desired or the system will be used to supplement a preexisting rolling radius method, a reset switch may still be used.

Prior to comparing the calculated slope value to the threshold slope value, it may be desirable to judge the quality of the linear regression by calculating the coefficient of determination ($R^2$) as is known and described in the above-mentioned statistical text at pages 474–475. Generally speaking, a high $R^2$ value (a value close to 1) signifies the percentage of variability accounted for in the linear regression. Calculation of the $R^2$ value could occur within block 30, or at a later point during the analysis (for example, just prior to issuing the warning at block 50).

Figure 2:
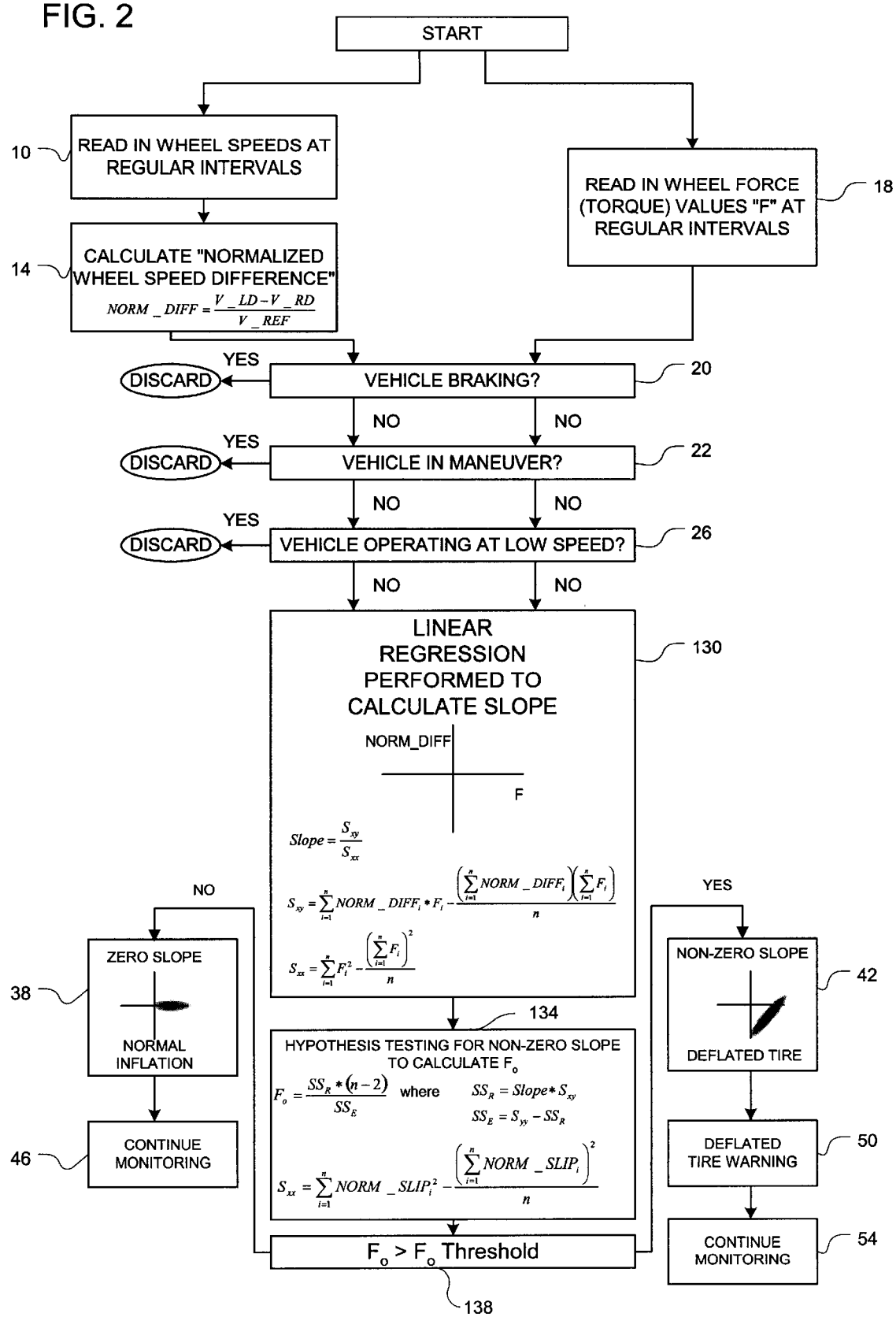
FIG. 2 represents a flow chart of an alternative method according to the invention.

A better way to judge the quality of the linear regression is shown in the flow chart of FIG. 2. The flow chart illustrated in FIG. 2 represents an alternative embodiment of the method of the present invention that is preferred to the method outlined in FIG. 1. Like reference numerals indicate like operational blocks. In the embodiment illustrated in FIG. 2, the calculated slope undergoes hypothesis testing, known as "significance of regression" testing to assess the adequacy of the simple linear regression. Block 130 replaces block 30 of FIG. 1, but is not substantially different. The slope calculation shown in block 130 is simply broken down into its numerator and denominator for the purpose of clarity. The clarified slope calculation is as follows:

$$\text{Slope} = \frac{S_{xy}}{S_{xx}}, \text{ where}$$

-continued $$S_{xy} = \sum_{i=1}^{n} NORM\_DIFF_i * F_i - \frac{\left(\sum_{i=1}^{n} NORM\_DIFF_i\right)\left(\sum_{i=1}^{n} F_i\right)}{n} \text{ and}$$

$$S_{xx} = \sum_{i=1}^{n} F_i^2 - \frac{\left(\sum_{i=1}^{n} F_i\right)^2}{n}$$

Block 134, which performs the significance of regression testing, replaces block 34 of FIG. 1, which simply compares the absolute value of the slope to a predetermined slope threshold. The significance of regression testing used in block 134 more robustly determines if the slope is non-zero by utilizing variance analysis. The significance of regression testing in block 134 is explained in detail in the above-mentioned statistical text at pages 461–465. Generally speaking, a variable $F_0$ is calculated using the following series of equations:

$$F_o = \frac{SS_R * (n-2)}{SS_E} \text{ where}$$

$$SS_R = \text{Slope} * S_{xy},$$

$$SS_E = S_{yy} - SS_R, \text{ and}$$

$$S_{yy} = \sum_{i=1}^{n} NORM\_DIFF_i^2 - \frac{\left(\sum_{i=1}^{n} NORM\_DIFF_i\right)^2}{n}$$

$F_0$ is then compared to a predetermined $F_0$ threshold (block 138) to determine whether the slope is in fact non-zero. The predetermined $F_0$ threshold value is determined empirically based on vehicle tests where a tire is deflated or when the grip-rate characteristics of a tire are known. If the comparison in block 138 indicates that the slope is zero, there is no deflated tire and the system continues monitoring (blocks 38 and 46). If the comparison in block 138 indicates that the slope is non-zero, there is a deflated tire and the warning is issued and monitoring continues (blocks 42, 50, and 54). This alternative embodiment more accurately accounts for statistical variance in the data sets, thereby resisting false deflation warnings.

Figure 3:
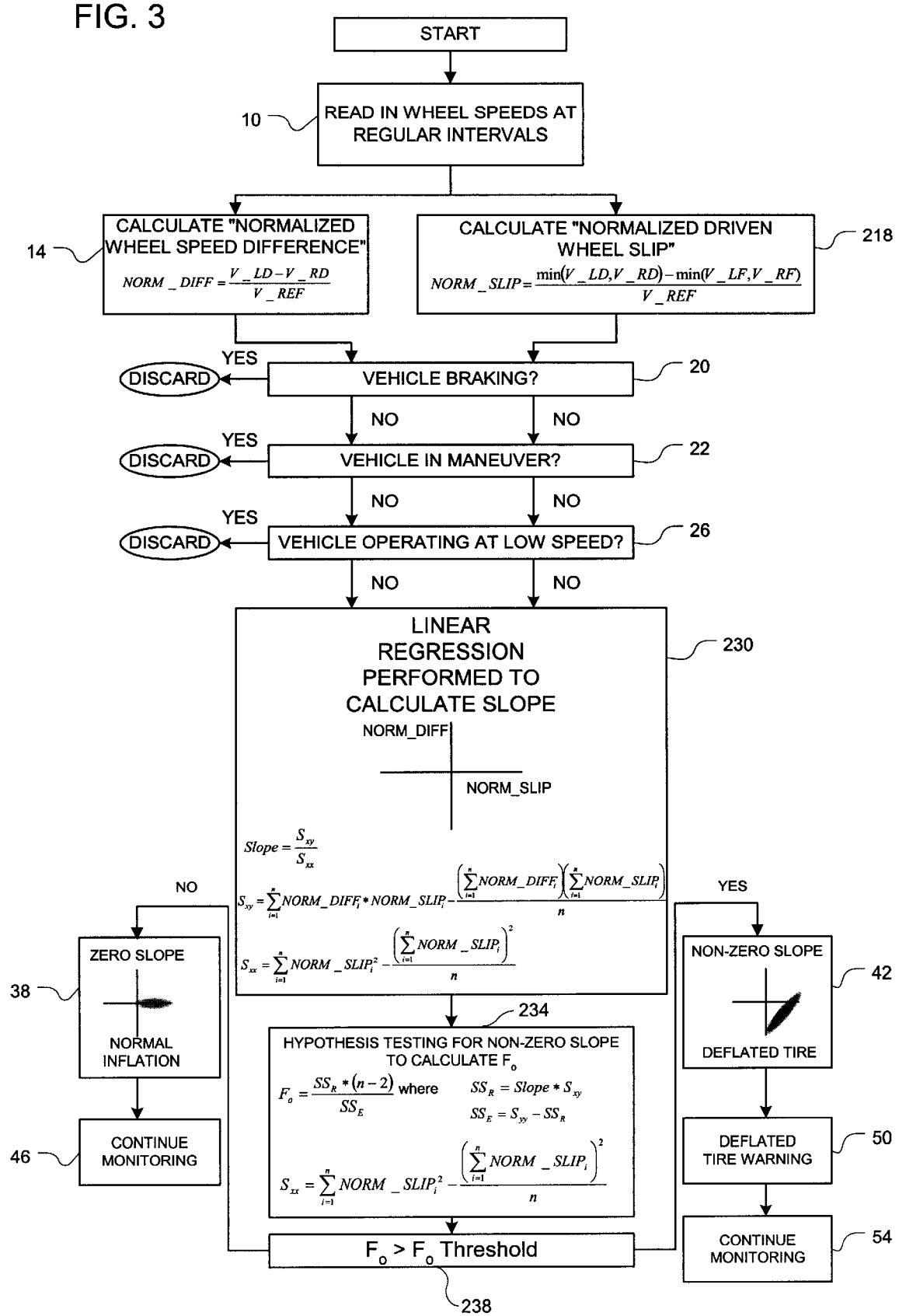
FIG. 3 represents a flow chart of another alternative method according to the invention.

FIG. 3 illustrates yet another embodiment of the present invention wherein the normalized driven wheel slip NORM_SLIP is substituted for the wheel force F. Recall from above that the wheel force and driven wheel slip are directly related for any given grip-rate. As such, it is possible to substitute driven wheel slip for wheel force when the wheel force data is not readily available. This substitution can only occur, however, for non all-wheel-drive vehicles since the calculation of NORM_SLIP requires wheel speeds of both driven and un-driven wheels. NORM_SLIP is calculated from the read-in wheel speeds according to the following equation:

$$NORM\_SLIP = \frac{\min(V\_LD, V\_RD) - \min(V\_LF, V\_RF)}{V\_REF}, \text{ where}$$

V_LD is the speed of the left driven wheel on the driven axle,

V_RD is the speed of the right driven wheel on the driven axle,

V_LF is the speed of the left follower wheel on the un-driven axle,

V_RF is the speed of the right follower wheel on the un-driven axle,

V_REF is the vehicle reference speed.

The vehicle reference speed is simply the average speed of all four wheels. The embodiment illustrated in FIG. 3 is substantially the same as the embodiment illustrated in FIG. 2 with the exception that the calculation of NORM_SLIP in block 218 flows from block 10 and replaces the reading-in of force values in block 18. All of the steps beginning with the filtering are the same as the steps in FIG. 2, except that NORM_SLIP replaces F in the subsequent linear regression analysis (blocks 230 and 234). All of the equations are modified only by substituting NORM_SLIP for every occurrence of F. As such, it should be appreciated that NORM_SLIP can replace F in the method of FIG. 1 just as it replaces F in the method of FIG. 2.

One of the main differences between the embodiments of FIGS. 1 and 2 as compared to the embodiment of FIG. 3 is the applications with which they can be used. As mentioned above, the embodiment of FIG. 3 can only be used for the driven axle of two-wheel-drive vehicles. The embodiments of FIGS. 1 and 2 can be used on two-wheel drive vehicles when some form of the force values for each wheel are available. Additionally, the embodiments of FIGS. 1 and 2 can also be used on all-wheel-drive vehicles when some form of the force values for all four wheels are available (i.e., with open differentials between the two wheels of each axle and between the front and rear axles, with a drive train having a constant proportional torque distribution between the four wheels, or by approximating the wheel forces by solving the standard sum of the forces equation: Force=Mass*Acceleration).

Each of the embodiments could also be used to supplement a rolling radius deflation detection method. Such a hybrid system would be advantageous in that the rolling radius method would accurately detect tire deflation while driving at low speeds with low tractive force, or while driving down-hill. The grip-rate method of the present invention would accurately detect tire deflation while driving at high speeds with high tractive force, or while driving uphill. As such, a hybrid system using the method of the present invention would provide accurate and dependable tire inflation monitoring over a wide range of driving conditions.

In each of the embodiments, the linear regression analysis can be performed with any number of data sets capable of yielding the appropriate results. Additionally, numerous ways of refreshing the data can be used. For example, the linear regression analysis can be continuously performed on the 6000 most recent data points passing through the filters. As each new data set is added to the linear regression analysis, the oldest of the 6000 data sets can be discarded. This method ensures that the system continuously monitors tire inflation using the most recently acquired data sets. Other alternatives, wherein entire data sets are collected, analyzed, and then discarded could also be used. Furthermore, it is possible to use a hybrid of the above-described alternative data refreshing methods, and such a hybrid may be beneficial when a reset switch is incorporated in the system.

While the methods described above with respect to FIGS. 1–3 describe using either engine torque values or wheel slip values to represent the tractive force at the driven wheels, one of ordinary skill in the art would understand that the methods of the present invention can be practiced using any other available values that are representative of, or related to the tractive force exerted on the driven wheels.

Various features of the invention are set forth in the following claims.

What is claimed is:

1. A method for detecting loss of pressure in a tire of a motor vehicle having first and second wheels on a driven axle and a tire on each of the first and second wheels, the method comprising:

measuring the wheel speeds of the first wheel and the second wheel a plurality of times n;

calculating a difference in wheel speed, NORM_DIFF, between the first wheel and the second wheel for each of the plurality of times n;

reading a wheel force value, F, for the first and second wheels for each of the plurality of times n;

pairing each NORM_DIFF value with the corresponding F value;

performing a linear regression on the n pairings of the NORM_DIFF values and the F values to determine the slope of a best-fit line; and analyzing the slope of the best-fit line to determine whether a tire on one of the first and the second wheels is deflated.

2. The method of claim 1, further including filtering the n pairings of the NORM_DIFF values and the F values to eliminate pairings obtained during vehicle braking.

3. The method of claim 1, further including filtering the n pairings of the NORM_DIFF values and the F values to eliminate pairings obtained during vehicle maneuvering.

4. The method of claim 1, further including filtering the n pairings of the NORM_DIFF values and the F values to eliminate pairings obtained during low-speed operation of the vehicle.

5. The method of claim 1, wherein analyzing the slope of the best-fit line includes determining an absolute value of the slope and comparing the absolute value of the slope to a predetermined slope threshold, the predetermined slope threshold being selected to substantially differentiate between a zero slope and a non-zero slope.

6. The method of claim 1, wherein analyzing the slope of the best-fit line includes performing significance of regression testing to determine an $F_0$ value and comparing the $F_0$ value to a predetermined $F_0$ threshold, the predetermined $F_0$ threshold being selected to substantially differentiate between a zero slope and a non-zero slope.

7. The method of claim 6, wherein $F_0$ is determined according to $$F_o = \frac{SS_R * (n-2)}{SS_E}, \text{ where}$$

$$SS_R = \text{Slope} * S_{xy},$$

$$S_{xy} = \sum_{i=1}^{n} NORM\_DIFF_i * F_i - \frac{\left(\sum_{i=1}^{n} NORM\_DIFF_i\right)^2 \left(\sum_{i=1}^{n} F_i\right)}{n},$$

$$\text{Slope} = \frac{S_{xy}}{S_{xx}}, \text{ where}$$

$$S_{xx} = \sum_{i=1}^{n} F_i^2 - \frac{\left(\sum_{i=1}^{n} F_i\right)^2}{n},$$

-continued $$SS_E = S_{yy} - SS_R, \text{ and}$$

$$S_{yy} = \sum_{i=1}^{n} NORM\_DIFF_i^2 - \frac{\left(\sum_{i=1}^{n} NORM\_DIFF_i\right)^2}{n}.$$

8. The method of claim 1 further including
issuing a warning when the slope of the best-fit line is determined to be non-zero.

9. The method of claim 1, wherein the driven axle is a first driven axle and the vehicle further includes a second driven axle having thereon a third wheel with a tire and a fourth wheel with a tire, the method further comprising:
measuring the wheel speeds of the third wheel and the fourth wheel a plurality of times n;
calculating a difference in wheel speed, NORM_DIFF', between the third wheel and the fourth wheel for each of the plurality of times n;
reading a wheel force value, F', for the third and fourth wheels for each of the plurality of times n;
pairing each NORM_DIFF' value with the corresponding F' value;
performing a linear regression on the n pairings of the NORM_DIFF' values and the F' values to determine the slope of a best-fit line; and
analyzing the slope of the best-fit line to determine whether a tire on one of the third and the fourth wheels is deflated.

10. The method of claim 1 further including
calculating a vehicle reference speed, and wherein NORM_DIFF is calculated according to $$NORM\_DIFF = \frac{V\_LD - V\_RD}{V\_REF},$$

where
V_LD is the speed of the first wheel,
V_RD is the speed of the second wheel, and
V_REF is the vehicle reference speed.

11. The method of claim 1, wherein the slope of the best-fit line is determined according to $$\text{Slope} = \frac{S_{xy}}{S_{xx}}, \text{ where}$$

$$S_{xy} = \sum_{i=1}^{n} NORM\_DIFF_i * F_i - \frac{\left(\sum_{i=1}^{n} NORM\_DIFF_i\right)\left(\sum_{i=1}^{n} F_i\right)}{n} \text{ and}$$

$$S_{xx} = \sum_{i=1}^{n} F_i^2 - \frac{\left(\sum_{i=1}^{n} F_i\right)^2}{n}.$$

12. A method for detecting loss of pressure in a tire of a motor vehicle having first and second wheels on a driven axle, third and fourth wheels on an un-driven axle, and a tire on each of the wheels, the method comprising:
measuring the wheel speeds of each of the wheels a plurality of times n;
calculating a difference in wheel speed, NORM_DIFF, between the first wheel and the second wheel for each of the plurality of times n;
calculating a driven wheel slip value, NORM_SLIP, for each of the plurality of times n;
pairing each NORM_DIFF value with the corresponding NORM_SLIP value;
performing a linear regression on the n pairings of the NORM_DIFF values and the NORM_SLIP values to determine the slope of a best-fit line; and
analyzing the slope of the best-fit line to determine whether a tire on one of the first and the second wheels is deflated.

13. The method of claim 12, further including
filtering the n pairings of the NORM_DIFF values and the NORM_SLIP values to eliminate pairings obtained during vehicle braking.

14. The method of claim 12, further including
filtering the n pairings of the NORM_DIFF values and the NORM_SLIP values to eliminate pairings obtained during vehicle maneuvering.

15. The method of claim 12, further including
filtering the n pairings of the NORM_DIFF values and the NORM_SLIP values to eliminate pairings obtained during low-speed operation of the vehicle.

16. The method of claim 12, wherein analyzing the slope of the best-fit line includes determining an absolute value of the slope and comparing the absolute value of the slope to a predetermined slope threshold, the predetermined slope threshold being selected to substantially differentiate between a zero slope and a non-zero slope.

17. The method of claim 12, wherein analyzing the slope of the best-fit line includes performing significance of regression testing to determine an $F_0$ value and comparing the $F_0$ value to a predetermined $F_0$ threshold, the predetermined $F_0$ threshold being selected to substantially differentiate between a zero slope and a non-zero slope.

18. The method of claim 17, wherein $F_0$ is determined according to $$F_o = \frac{SS_R * (n-2)}{SS_E}, \text{ where}$$

$$SS_R = \text{Slope} * S_{xy},$$

$$S_{xy} = \sum_{i=1}^{n} NORM\_DIFF_i * NORM\_SLIP_i -$$

$$\frac{\left(\sum_{i=1}^{n} NORM\_DIFF_i\right)\left(\sum_{i=1}^{n} NORM\_SLIP_i\right)}{n},$$

$$\text{Slope} = \frac{S_{xy}}{S_{xx}}, \text{ where}$$

$$S_{xx} = \sum_{i=1}^{n} NORM\_SLIP_i^2 - \frac{\left(\sum_{i=1}^{n} NORM\_SLIP_i\right)^2}{n},$$

$$SS_E = S_{yy} - SS_R, \text{ and}$$

$$S_{yy} = \sum_{i=1}^{n} NORM\_DIFF_i^2 - \frac{\left(\sum_{i=1}^{n} NORM\_DIFF_i\right)^2}{n}.$$

19. The method of claim 12 further including
issuing a warning when the slope of the best-fit line is determined to be non-zero.

20. The method of claim 12 further including
calculating a vehicle reference speed, and wherein NORM_DIFF is calculated according to $$NORM\_DIFF = \frac{V\_LD - V\_RD}{V\_REF},$$

where

V_LD is the speed of the first wheel,
V_RD is the speed of the second wheel, and
V_REF is the vehicle reference speed.

21. The method of claim 12, wherein the slope of the best-fit line is determined according to $$\text{Slope} = \frac{S_{xy}}{S_{xx}}, \text{ where}$$

$$S_{xy} = \sum_{i=1}^{n} NORM\_DIFF_i * NORM\_SLIP_i - \frac{\left(\sum_{i=1}^{n} NORM\_DIFF_i\right)\left(\sum_{i=1}^{n} NORM\_SLIP_i\right)}{n}$$

$$\text{and } S_{xx} = \sum_{i=1}^{n} NORM\_SLIP_i^2 - \frac{\left(\sum_{i=1}^{n} NORM\_SLIP_i\right)^2}{n}.$$

22. A method for detecting loss of pressure in a tire of a motor vehicle having first and second wheels on a driven axle and a tire on each of the wheels, each of the tires having a grip-rate, the method comprising:

measuring the wheel speeds of the first wheel and the second wheel a plurality of times n;

calculating a difference in wheel speed value between the first wheel and the second wheel for each of the plurality of times n;

determining a value representative of the tractive force for the first wheel and the second wheel for each of the plurality of times n;

pairing each difference in wheel speed value with the value representative of the tractive force;

performing a linear regression on the n pairings of the difference in wheel speed values and the values representative of the tractive force; and analyzing the linear regression to determine whether a tire on one of the first and the second wheels is deflated.

23. The method of claim 22, wherein determining the value representative of the tractive force includes determining a driven wheel force value for each of the plurality of times n.

24. The method of claim 22, wherein determining the value representative of the tractive force includes determining a driven wheel slip value for each of the plurality of times n.

25. The method of claim 22, wherein analyzing the linear regression includes determining the slope of a best-fit line.

* * * * *

UNITED STATES PATENT AND TRADEMARK OFFICE
CERTIFICATE OF CORRECTION

PATENT NO. : 6,285,280 B1  
DATED : September 4, 2001  
INVENTOR(S) : Orson Szu-Han Wang Page 1 of 1

It is certified that error appears in the above-identified patent and that said Letters Patent is hereby corrected as shown below:

Column 12,  
Line 45, delete $$\frac{\left(\sum_{i=1}^{n} NORM\_DIFF_i\right)^2 \left(\sum_{i=1}^{n} NORM\_SLIP_i\right)}{n}$$

and insert $$\frac{\left(\sum_{i=1}^{n} NORM\_DIFF_i\right)\left(\sum_{i=1}^{n} NORM\_SLIP_i\right)}{n}$$

Signed and Sealed this

Seventh Day of May, 2002

Attest:

JAMES E. ROGAN  
Attesting Officer — Director of the United States Patent and Trademark Office